US010582402B2

(12) United States Patent
Oldewurtel

(10) Patent No.: US 10,582,402 B2
(45) Date of Patent: Mar. 3, 2020

(54) METHOD AND SYSTEM FOR DETERMINING A MOBILE COMMUNICATIONS NETWORK QUALITY AND DOWNLOADING MOBILE COMMUNICATIONS DATA

(71) Applicant: AUDI AG, Ingolstadt (DE)

(72) Inventor: Frank Oldewurtel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 10 days.

(21) Appl. No.: 14/432,344

(22) PCT Filed: Aug. 2, 2013

(86) PCT No.: PCT/EP2013/002316
§ 371 (c)(1),
(2) Date: Jul. 1, 2015

(87) PCT Pub. No.: WO2014/048518
PCT Pub. Date: Apr. 3, 2014

(65) Prior Publication Data
US 2015/0304874 A1 Oct. 22, 2015

(30) Foreign Application Priority Data
Sep. 28, 2012 (DE) .......................... 10 2012 019 185

(51) Int. Cl.
*H04W 24/10* (2009.01)
*H04W 4/029* (2018.01)
(Continued)

(52) U.S. Cl.
CPC ............. *H04W 24/10* (2013.01); *H04L 67/12* (2013.01); *H04W 4/029* (2018.02); *H04W 4/44* (2018.02); *H04W 28/26* (2013.01); *G01C 21/32* (2013.01)

(58) Field of Classification Search
CPC ..... H04W 24/10; H04W 4/046; H04W 4/028; H04W 28/26; H04L 67/12; G01C 21/32
See application file for complete search history.

(56) References Cited

U.S. PATENT DOCUMENTS 6,212,474 B1 * 4/2001 Fowler ............... G01C 21/3629
701/440
6,317,686 B1 * 11/2001 Ran .................... G01C 21/3691
701/117

(Continued)

FOREIGN PATENT DOCUMENTS

| CN | 101246476 | 8/2008 |
|----|-----------|--------|
| DE | 100 64 955 | 7/2002 |

(Continued)

OTHER PUBLICATIONS

German Office Action for German Priority Patent Application No. 10 2012 019 185.5, dated May 22, 2013, 7 pages.

(Continued)

*Primary Examiner* — Andrew Lai
*Assistant Examiner* — Chuong M Nguyen
(74) *Attorney, Agent, or Firm* — Staas & Halsey LLP

(57) ABSTRACT

A method determines a mobile communications network quality for downloading mobile communications data. Data which quantify the mobile communications network quality in a current location of a respective motor vehicle, is continually acquired using acquisition units provided in the motor vehicle. This data is transferred to a database in which it is stored. A route of a select motor vehicle is determined. A data record quantifying the mobile communications network quality along the route, is retrieved from the database. Mobile communications data is downloaded to a memory of the select motor vehicle taking the data record into consideration. A total data record quantifying the mobile communications network quality is determined at predetermined (Continued)

intervals by a data processing device, taking into consideration the data transferred to the database, and the data record quantifying the mobile communications network for the select motor vehicle is obtained from this total data record.

20 Claims, 1 Drawing Sheet

(51) Int. Cl.
H04W 4/44 (2018.01)
H04W 28/26 (2009.01)
H04L 29/08 (2006.01)
G01C 21/32 (2006.01)

(56) References Cited

U.S. PATENT DOCUMENTS

| | | | | |
|---|---|---|---|---|
| 6,466,797 | B1* | 10/2002 | Frodigh | H04W 24/00 370/332 |
| 6,542,818 | B1* | 4/2003 | Oesterling | G01C 21/26 342/357.31 |
| 7,925,436 | B2* | 4/2011 | Blackwood | G01C 21/26 340/995.12 |
| 9,384,054 | B2* | 7/2016 | Uola | G06F 9/5033 |
| 2002/0029108 | A1* | 3/2002 | Liu | G01C 21/26 701/410 |
| 2003/0182360 | A1* | 9/2003 | Mocek | H04L 29/06 709/203 |
| 2006/0200303 | A1* | 9/2006 | Fuentes | G01C 21/3492 701/532 |
| 2006/0211421 | A1* | 9/2006 | Vuong | H04W 48/18 455/434 |
| 2009/0228199 | A1* | 9/2009 | Bhogal | G01C 21/3461 701/425 |
| 2010/0017121 | A1* | 1/2010 | Diaz | G01C 21/3667 701/533 |
| 2010/0106603 | A1* | 4/2010 | Dey | G01C 21/3484 705/14.63 |
| 2011/0310733 | A1* | 12/2011 | Tzamaloukas | G01C 21/3691 370/230 |
| 2012/0127947 | A1 | 5/2012 | Usui | |
| 2013/0054791 | A1* | 2/2013 | Oki | G06F 11/3409 709/224 |
| 2014/0067257 | A1* | 3/2014 | Dave | H04W 24/08 701/423 |
| 2014/0215491 | A1* | 7/2014 | Addepalli | H04W 72/0406 719/313 |

FOREIGN PATENT DOCUMENTS

| | | |
|---|---|---|
| DE | 10064955 | 7/2002 |
| DE | 10 2004 055 275 | 5/2006 |
| DE | 102008050406 | 4/2010 |
| DE | 10 2009 060 358 | 6/2011 |
| DE | 102009060358 | 6/2011 |
| DE | 102010002740 | 9/2011 |
| DE | 10 2010 028 859 | 11/2011 |
| DE | 102010028859 | 11/2011 |
| DE | 102010028996 | 11/2011 |
| DE | 102010029931 | 12/2011 |
| DE | 10 2011 118 706 | 5/2013 |
| WO | 01/19108 | 3/2001 |

OTHER PUBLICATIONS

German Office Action for German Priority Patent Application No. 10 2012 019 185.5, dated Feb. 17, 2014, 6 pages.
German Office Action for German Priority Patent Application No. 10 2012 019 185.5, dated Jun. 11, 2014, 5 pages.
English language copy of the International Search Report for PCT/EP2013/002316, dated Oct. 18, 2013, 3 pages.
WIPO English language translation of the International Preliminary Report on Patentability for PCT/EP2013/002316, downloaded from WIPO website on Mar. 30, 2015, 5 pages.
PCT/EP2013/002316, Aug. 2, 2013, Frank Oldewurtel, Audi AG.
DE 10 2012 019 185.5, Sep. 28, 2012, Frank Oldewurtel, Audi AG.
Certified English language translation of the form PCT/IPEA/409 Supplemental Sheets for PCT/EP2013/002316, dated Apr. 15, 2014, 3 pages.
Certified English language translation of the transmittal letter submitting amended claims to the European Patent Office for PCT/EP2013/002316, dated Feb. 19, 2014, 7 pages.
German Office Action dated Jul. 24, 2017 in corresponding German Patent Application No. 10 2012 025 726.0.
Chinese Office Action dated Aug. 29, 2017 in corresponding Chinese Patent Application No. 201380050624.8.
German Office Action dated Oct. 24, 2017 in corresponding German Patent Application No. 10 2012 025 726.0.

* cited by examiner

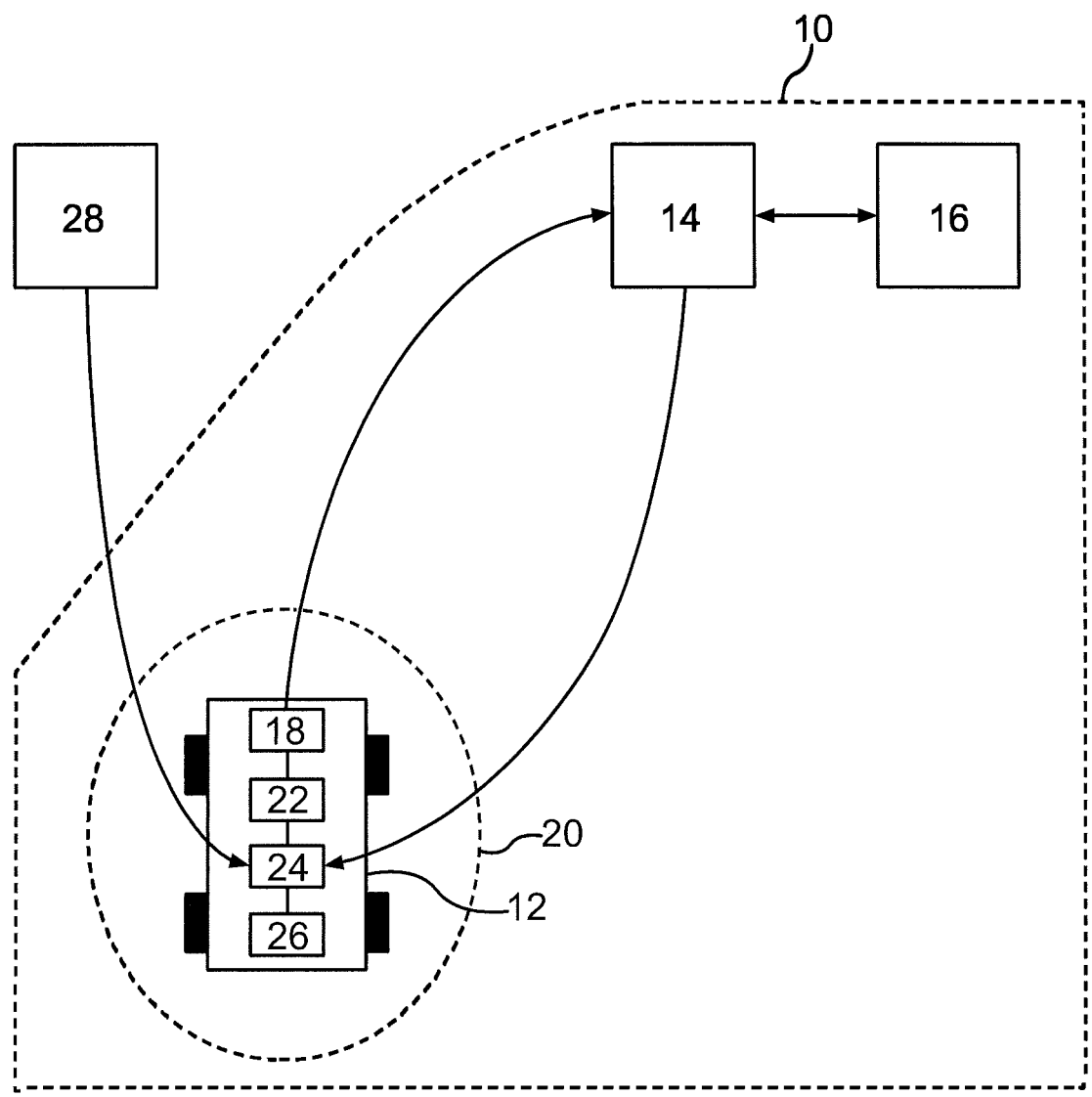

METHOD AND SYSTEM FOR DETERMINING A MOBILE COMMUNICATIONS NETWORK QUALITY AND DOWNLOADING MOBILE COMMUNICATIONS DATA

CROSS REFERENCE TO RELATED APPLICATIONS

This application is based on and hereby claims priority to International Application No. PCT/EP2013/002316 filed on Aug. 2, 2013 and German Application No. 10 2012 019 185.5 filed on Sep. 28, 2012, the contents of which are hereby incorporated by reference.

BACKGROUND

The invention relates to a method for determining a mobile communications network quality and downloading of mobile communications data. Furthermore, the invention relates to a system for determining a mobile communications network quality and downloading of mobile communications data.

Such a method is known from DE 10 2010 028 859 A1. For determining a mobile communications network quality, data are continuously acquired by acquisition units provided in motor vehicles which data quantify the mobile communications network quality at a present location of the respective motor vehicle. Subsequently, the respective data are transmitted to a database in which the data are stored. Before the downloading of corresponding mobile communications data, a route of at least one of the motor vehicles is determined and subsequently a data record quantifying the mobile communications network quality along the route determined is retrieved from the database by a communication unit of the motor vehicle. Finally, mobile communications data are downloaded into a data memory of the motor vehicle by the communication unit, taking into consideration the data record. Furthermore, DE 10 2010 028 859 A1 shows a corresponding system for performing the method.

DE 10 2010 002 740 A1 shows a vehicle communication system comprising a data interface at the vehicle and a mobile terminal, independent from a vehicle, comprising a data memory in a data interface which is designed for communication with the data interface at the vehicle. Furthermore, the vehicle communication system comprises a decision unit which is configured for classifying data which are available at the vehicle, either as data having a short latency period of data having a long latency period. The vehicle communication system is also designed for sending data which are available at the vehicle and have a short latency period via a mobile communications interface to a central computer device and transmitting data which are available at the vehicle and have a high latency period from the data interface at the vehicle to the data interface of the mobile terminal and temporarily store them in the data memory.

DE 10 20120 028 996 A1 shows a method in which data are transmitted from a network external to the vehicle to a control unit of a motor vehicle and conversely. In this context, it is possible that certain data are initially temporarily stored until a sufficiently good communications link to the network is given.

Furthermore, DE 10 2010 029 931 A1 and DE 10 2008 050 406 A1 in each case show a method in which data are transmitted between a server and a motor vehicle.

SUMMARY

One possible object is to provide a method and a system of the type initially mentioned by which a mobile communications network quality can be determined and mobile communications data can be downloaded in an improved manner.

The inventor proposes a method for determining a mobile communications network quality and downloading mobile communications data comprises the following:
- continual acquisition of data which quantify the mobile communications network quality at a present location of a respective motor vehicle by acquisition units provided in the motor vehicles;
- transmitting the data to a database in which the data are stored;
- determining a route of at least one of the motor vehicles;
- retrieving a data record quantifying the mobile communications network quality along the route from the database by a communication unit of the motor vehicle;
- downloading mobile communications data into a data memory of the motor vehicle by the communication unit, taking into consideration the data record; the proposed method being characterized in that
- by a data processing device, an overall data record quantifying the mobile communications network quality is determined at predetermined intervals, taking into consideration the data transmitted to the database, and is stored in the latter;
- the data record quantifying the mobile communications network quality along the route is obtained from the continually updated total data record.

Thus, in the form of the total data record, a global knowledge base is created over a large and possibly also increasing number of motor vehicles along respective travel routes of the motor vehicles, which knowledge base quantifies the mobile communications network quality along the routes traveled in each case by the motor vehicles. The extent, the quality and the reliability of this knowledge base is continuously improved and updated by the continuous adding of information from the respective motor vehicles. This a priori knowledge about respective mobile communications network qualities for certain locations or along certain routes will then be used for a prediction of respective channel qualities at expected vehicle positions along travel routes planned in each case. In contrast to the method shown in DE 10 2010 028 859 A1, an overall data record characterizing the mobile communications network quality is thus updated continually, taking into consideration continuously added data. Boundary conditions changing with time which influence the mobile communications network quality in the regions in which the respective motor vehicles determine them are thus updated time and again so that a particularly accurate database is provided for predicting the mobile communications network quality.

Knowing the respective mobile communications network quality along the respective routes of the various motor vehicles, corresponding preloading mechanisms for downloading mobile communications data for the most varied applications of the motor vehicle can be applied. These allow selective preloading of data, for example in the form of media contents which will probably be retrieved in future by a user. In principle, the data can be any type of data, for example text data, image data, music data, film data, etc. By applying these preloading mechanisms, media contents of on-line functions, for example, are made available locally in the respective motor vehicles so that they can be consumed at any time and faultlessly independently of the mobile communications link. Depending on the type of on-line function and expected channel quality, the preloading strategy to be pursued varies, e.g. with regard to the number of media contents to be preloaded and the order, on the basis of priorities.

Lastly, a decision logic selects from a set of developed preloading mechanisms the suitable strategy with regard to the currently predicted vehicle situation or mobile communications network quality, respectively. In the case of an impairment of the mobile communications link, occurring for a short time, for example, on account of the preloading of media contents at times when the mobile communications link is still good, the availability and the service quality of on-line functions are thus considerably enhanced. By holding media contents from on-line sources available locally, frequent fault cases can be avoided by already accessing the local source created before fault cases occur.

In an advantageous embodiment it is provided that on the basis of the total data record, a digital map linked to the database is generated at specific intervals, by which the mobile communications network quality is mapped. In other words, a type of navigation map is deposited in a back end which is enriched with the edited data from the knowledge base obtained continuously and linked. Thus a type of global quality map is provided via this additional map information for the mobile communications network quality by which a selected preloading of mobile communications data is supported additionally.

In a further advantageous embodiment, it is provided that, taking into consideration the data record for different applications of the motor vehicle, respective sequences are specified according to which the respective mobile communications data allocated to the applications are downloaded into the data memory. For example, a respective priority can be predetermined for various applications of the motor vehicle or predetermined by a user, the data for the high-priority applications being downloaded first into the data memory in order to secure at least their operability along the route.

A further advantageous embodiment provides that, taking into consideration the data record for the various applications, respective times are specified after which the respective mobile communications data allocated to the applications are downloaded into the data memory. By this means, it is possible, inter alia, to ensure application-specifically that respective mobile communications data are thus provided or downloaded locally into the data memory, taking into consideration the predicted mobile communications network quality along the route, in time so that the respective applications can be executed free of interruption or disturbance.

In a further advantageous embodiment, it is provided that, taking into consideration the data record for the various applications, respective data rates are specified according to which the respective mobile communications data allocated to the applications are downloaded into the data memory. On the one hand, this takes into consideration the local data rate or data rate available overall in each case along the route and on the other hand, the data rate available overall is distributed, in dependence on the respective applications, to the respective applications in such a manner that they can be operated as free of interference as possible.

According to a further advantageous embodiment, it is provided that by favorites and/or replay lists stored in the communication unit, the mobile communications data to be downloaded are determined. For example, it can be known from user profiles stored which websites are called up, which on-line radio streams are received or other similar on-line service are normally used so that mobile communications data to be downloaded correspondingly for the most varied applications of the motor vehicle can be predicted as accurately as possible in advance and downloaded in dependence on the predicted mobile communications network quality along the route into the data memory in time.

In a further advantageous embodiment, it is provided that measurement values with respect to a received signal strength, a signal delay time, a network loading, a data transmission rate and/or a mobile communications network type are determined as data which characterize the mobile communications network quality at the present location of the respective motor vehicle. In this manner, the mobile communications network quality can be determined especially accurately at the present locations of the respective motor vehicles.

A further advantageous embodiment provides that the mobile communications network quality is determined for various daytimes, weekdays, seasons and/or events and stored in the total data record. Corresponding fluctuations of the mobile communications network quality usually occurring at different daytimes, weekdays, seasons and/or events are thus taken into consideration so that the total data record characterizing the mobile communications network quality is especially accurate. For example, a different number of motor vehicles can travel a particular route dependent on the clock time and cause a correspondingly high volume of mobile communication data. In consequence, the data rate which can be used per motor vehicle also fluctuates since normally the data rate provided per radio cell has a substantially constant value. To this extent, different preloading mechanisms adapted in each case can be selected or utilized in dependence on time.

A further advantageous embodiment provides that by a display device of the motor vehicle, a map section is displayed in which the mobile communications network quality based on the data record is shown along the route. In this manner, passengers in the motor vehicle are shown in a particularly simple manner the predicted mobile communications network quality along the selected route or along the predicted route, respectively, so that the users find out early whether correspondingly desired applications of the motor vehicle can be carried out at all along the route. Furthermore, the users, knowing the mobile communications network quality along the route, can themselves set corresponding preloading mechanisms, if necessary, for respective applications in such a manner that their operability along the route can be ensured.

In a further advantageous embodiment, there is provided that respective present position coordinates of the motor vehicles are acquired and grouped jointly with the acquired data to form respective data tuples and conveyed to the database. Furthermore, it is provided, according to an advantageous embodiment that respective present daytimes and/or date information are acquired and grouped jointly with the acquired data to form respective data tuples and conveyed to the database. In this manner, the mobile communications network quality can be determined even more accurately in that respective locations and/or daytimes and various date information can be allocated to it.

The data tuples are conveyed to the database preferably immediately after having been grouped or are initially combined to form a data tuple record comprising a plurality of data tuples and are conveyed only thereafter to the database. In this context, it can be taken into consideration, for example, how good a momentary mobile communications network quality is so that, on the basis of this, it can be decided whether the data tuples should be conveyed immediately or first delayed in time and grouped. An important reason for this data aggregation is that it is frequently more efficient to send out fewer large data packets than small data packets instead. More efficient should be understood here in the sense of energy consumption and data throughput with respect to a link or a linking channel.

The inventor also proposes a system for determining a mobile communications network quality and downloading of mobile communications data comprises:
a plurality of motor vehicles comprising respective acquisition units which are designed to continually acquire data which quantify the mobile communications network quality at a present location of the respective motor vehicles and transmit these to a database of the system which is designed to store the data;
respective route determining units of the motor vehicles which are designed to determine a route of the respective motor vehicles;
respective communication units of the motor vehicles which are designed to retrieve respective data records, quantifying the mobile communications network quality along the respective routes, from the database and to download mobile communications data into a respective data memory of the motor vehicles, taking into consideration the respective data records;
the proposed system being characterized in that
the system comprises a data processing device which is designed to determine an overall data record quantifying the mobile communications network quality in predetermined intervals, taking into consideration the data transmitted to the database, and to store it in the latter;
the retrieved data record is at least a part of the continually updated total data record.

Advantageous embodiments of the proposed method should be considered as advantageous embodiments of the system, the system, in particular, here carries out the method.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE shows a diagrammatic representation of a system for determining a mobile communications network quality and downloading of mobile communications data.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

A system 10 for determining a mobile communications network quality and downloading of mobile communications data comprises a plurality of motor vehicles 12, only one motor vehicle 12 being shown presently for the purpose of simplified representation, a database 14 and a data processing device 16. The motor vehicles 12 comprise respective acquisition devices 18 which are designed for continually acquiring data which quantify the mobile communications network quality at a present location 20 of the respective motor vehicles 12. Furthermore, the acquisition devices 18 are designed for transmitting the acquired data to the database 14 of the system 10 which, in turn, is designed for storing the data.

The acquisition devices 18 can be vehicle sensor systems already conventionally installed in motor vehicles 12 which can periodically collect and locally preprocess measurement values in the form of raw data and further information with respect to a channel quality or received signal strength and of a mobile communications network or of the mobile communications network type. In addition, measurement values with respect to a signal delay time, a network loading and/or a data transmission rate can be determined as data which characterize the mobile communications network quality at the present location 20 of the respective motor vehicle 12, and transmitted to the database 14.

The motor vehicles 12 also comprise respective route determining units 22 which are designed to determine a route of the respective motor vehicles 12. The route determining unit 22 can be, for example, a navigation device of the motor vehicle 12, by which a route to a predetermined destination can be determined. Furthermore, the route determining unit 22 can also be designed to predict a probable route, which will be traveled with the motor vehicle 12, by the most varied empirical or measurement values.

The motor vehicles 12 also comprise respective communication units 24 which are designed to retrieve respective data records, quantifying the mobile communications network quality along the respective routes, from the database 14 and to download mobile communications data into a respective data memory 26, taking into consideration the respective data records. The motor vehicles 12 can also have several other data memories, not shown here, into which respective data can be downloaded application-specifically via the mobile communications network.

The communication unit 24 can be, for example, an infotainment system of the motor vehicle 12 which is designed to send and to receive mobile communications data. The data memory 26 can be, for example, a storage unit of the infotainment system, for example in the form of a hard disk, a memory card or the like on which data or information can be temporarily stored and corresponding applications of the motor vehicle or of the infotainment system can be provided.

The data processing device 16 is also designed to determine an overall data record quantifying the mobile communications network quality at predetermined intervals, taking into consideration the data transmitted to the database, and to store it in the latter. The data record retrieved in each case is at least a part of the continually updated overall data record.

In the text which follows, a method for determining a mobile communications network quality and for downloading of mobile communications data into the respective data memories 26 of the motor vehicles 12 will be explained. A multiplicity of motor vehicles 12 which are allocated to the system 10 continuously acquire data which quantify the mobile communications network quality at a present location 20 of one of the respective motor vehicles 12, by the acquisition units 18 provided in the motor vehicles 12. In this context, respective present position coordinates of the motor vehicles 12 are acquired and grouped jointly with the acquired data to form respective data tuples. Furthermore, respective present daytimes and/or date information are also acquired and grouped jointly with the acquired data to form respective data tuples. The data or data tuples thus acquired are conveyed to the database 14 either immediately after their grouping at the respective acquisition devices 18 or are initially combined to form a data tuple record comprising a plurality of data tuples and are conveyed only thereafter to the database 14 at predetermined time intervals.

In all motor vehicles 12 belonging to the system 10, a route can be determined or predicted by the route determining units 22 prior to the respective motor vehicle 12 setting off or during travel thereof. Subsequently, a data record quantifying the mobile communications network quality along the route is retrieved from the database 14 by the respective communication units 24.

By the data processing device 16, an overall data record quantifying the mobile communications network quality is continuously determined at predetermined intervals, taking into consideration the data transmitted to the database, and stored in the database 14. In this context, the mobile communications network quality can be determined for various daytimes, weekdays, seasons and/or events and deposited in the overall data record. Thus, the data record quantifying the mobile communications network quality along the respective routes also contains information, from the continually updated overall data record, on how the mobile communications network quality could fluctuate presumably in dependence on the clock time, the weekday and/or a particular date such as, for example, a beginning of vacation, a holiday or the like.

On the basis of the continually updated overall data record, a digital map linked to the database 14 is generated at specified intervals, by which the mobile communications network quality is mapped.

As soon as the respective data records for characterizing the mobile communications network quality along respective routes of the motor vehicles 12 have been retrieved, corresponding mobile communications data for operating respective applications of the motor vehicle 12 are downloaded into the respective data memories 26, taking into consideration these data records.

In this context, respective sequences are specified for different applications of the motor vehicle, according to which sequences the respective mobile communications data allocated to the applications are downloaded into the data memory 26. In addition, taking into consideration the data record, respective times are also specified for the different applications after which the respective mobile communications data allocated to the applications are downloaded into the data memory. In addition, taking into consideration the data record for the different applications, respective data rates are also specified according to which the respective mobile communications data allocated to the applications are downloaded into the data memory 26.

For example, a data source 28 is shown from which corresponding data or data packets for operating respective applications of the motor vehicle 12 are loaded into the data memory 26 in the form of mobile communications data by the communication unit 24. The data source can be, for example, a server linked to the Internet, on which music data, video data, news in text and/or image form or the like are provided. Thus, certain media contents or data are selectively preloaded into the data memories 26 which will be retrieved presumably by a user in future. Relevant contents can be identified, e.g. via established favorites or replay lists of the user in the relevant on-line function.

By applying the preloading mechanisms, media contents of on-line functions are made available locally in the motor vehicle 12 so that these can be consumed at any time and faultlessly independently of the mobile communications link. The data memory 26 thus acts as a local data source within the motor vehicles 12. Depending on the type of on-line function and expected channel quality, this varies for various preloading strategies, e.g. with regard to the number of media contents to be preloaded and the order, on the basis of priorities.

A decision logic lastly selects from a set of different preloading mechanisms the suitable strategy with regard to the vehicle situation currently predicted or predicted route in dependence on the currently given mobile communications network quality. In addition, it is possible that, by a display device, not shown here, of the motor vehicles 12, a respective map section is displayed in which the mobile communications network quality based on the data record along the route is shown. Thus, vehicle passengers are informed at any time about how good a respective mobile communications network quality is along the predicted or the selected route so that the users, if necessary, themselves can also specify corresponding preloading mechanisms in order to prioritize mobile communications data in the form of media contents for different applications in such a manner that their operability along the route is ensured.

Overall, the availability and the quality of service of on-line functions is considerably enhanced with the system 10 and by the method explained, especially in the case of an impairment of a mobile communications link or mobile communications network quality, occurring within a short time, by corresponding preloading media contents at times when the mobile communications link is still good. By keeping media contents from on-line sources available locally, frequent fault cases can be avoided by already accessing the generated local source in the form of the data memory 26 before fault cases occur.

The method explained is also very rugged since, e.g. it renders buffer errors due to poor or fluctuating channel qualities and connection breakdowns due to communications gaps manageable. By holding media contents from on-line sources available locally, the effects of these frequent fault cases are no longer perceptible to corresponding users. The reason for this is that, before a poor mobile communications link occurs, it is possible to access the corresponding local source in the form of the data memory 26.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for determining a mobile communications network quality and downloading of mobile communications data, comprising:
   continually acquiring, using acquisition units provided in respective motor vehicles, data which quantify the mobile communications network quality such that each acquisition unit acquires information about the mobile communications network quality for one of the motor vehicles, at a present location of the motor vehicle along a travel route of the motor vehicle;
   transmitting the data to a database in which the data are stored, the database being remote from the motor vehicles;
   determining a route of a select motor vehicle;

determining, using a data processing device, a network data record quantifying the mobile communications network quality, the network data record being continually updated, taking into consideration the data transmitted to the database, the network data record being stored in the database, the network data record quantifying the mobile communications network quality along travel routes of the respective motor vehicles;

after determining the route, retrieving, by a communication unit of the select motor vehicle, an individual data record quantifying the mobile communications network quality along the route of the select motor vehicle, the individual data record being obtained from the network data record, the individual data record being acquired from the database;

downloading mobile communications data for operating respective different applications within the select motor vehicle, the mobile communications data being downloaded into a data memory of the select motor vehicle by the communication unit, the mobile communications data being downloaded taking into consideration for the different applications, the individual data record, the mobile communications data being downloaded according to predetermined respective data rates, the data rates being predetermined by allocating available mobile communications data to the different applications, wherein a prediction is made regarding which of the different applications will be used along the route of the select motor vehicle, based on the individual data record quantifying the mobile communications network quality along the route, and based on the prediction regarding which of the different applications will be used, data are downloaded into the data memory so that the data will be available locally within the select motor vehicle when needed by the applications predicted to be used, the prediction is a prediction regarding a sequence with which the different applications will be used by a user, and the individual data record is taken into consideration for the different applications of the select motor vehicle to specify a sequence according to which the mobile communications data is allocated to the different applications.

2. The method as claimed in claim 1, wherein,
based on the network data record, a digital map linked to the database is generated at specified intervals, and
the mobile communications network quality is represented with the digital map.

3. The method as claimed in claim 1, wherein,
the individual data record is taken into consideration for the different applications to assign download start times to at least two different applications in a plurality of applications, and
after occurrence of each download start time, mobile communications data are downloaded for one of the at least two different applications.

4. The method as claimed in claim 1, wherein,
at least one of audio favorites and an audio play list is stored in the data memory and used to predict data use along the route of the select motor vehicle, to allocate the mobile communications data to the different applications.

5. The method as claimed in claim 1, wherein
the data which quantify the mobile communications network quality at the present location include at least one data item selected from the group consisting of received signal strength measurement values, signal delay time measurement values, network loading measurement values, data transmission rate measurement values and information specifying type of available mobile communications network.

6. The method as claimed in claim 1, wherein
the network data record includes information regarding the mobile communications network quality for at least one of different daytimes, different weekdays, different seasons and different events.

7. The method as claimed in claim 1, wherein
a display device of the select motor vehicle displays, based on the individual data record, a visual map showing the mobile communications network quality along the route.

8. The method as claimed in claim 1, wherein
each acquisition unit acquires present position coordinates for one of the motor vehicles,
data tuples are formed by grouping the present position coordinates with the data which quantify the mobile communications network quality, and
transmitting the data to the database comprises transmitting the data tuples.

9. The method as claimed in claim 8, wherein
the data tuples are transmitted to the database immediately after having been formed.

10. The method as claimed in claim 8, wherein
before being transmitted to the database, the data tuples are combined to form a data tuple record comprising a plurality of data tuples.

11. The method as claimed in claim 1, wherein
each acquisition unit forms data tuples by grouping current time of day and/or current date information with the data which quantify the mobile communications network quality, and
transmitting the data to the database comprises transmitting the data tuples.

12. The method as claimed in claim 11, wherein
the data tuples are transmitted to the database immediately after having been formed.

13. The method as claimed in claim 11, wherein
before being transmitted to the database, the data tuples are combined to form a data tuple record comprising a plurality of data tuples.

14. The method as claimed in claim 1, wherein
the mobile communications data are allocated such that data for high priority applications are downloaded before data for low priority applications.

15. The method as claimed in claim 1, wherein
the route of the select motor vehicle is determined by a prediction based on prior routes.

16. The method as claimed in claim 1, wherein
determining the route of the select motor vehicle comprises predicting a predicted route likely to be used by the select motor vehicle.

17. The method as claimed in claim 1, wherein the applications are network-quality-dependent applications.

18. A system to determine a mobile communications network quality and to download mobile communications data, comprising:
a plurality of motor vehicles comprising respective acquisition units to continually acquire data along respective travel routes of the motor vehicles, each acquisition unit acquiring data which quantify the mobile communications network quality at a present location of one of the motor vehicles and transmitting the data to a database of the system, which stores the data, the database being remote from the motor vehicles;
respective route determining units of the motor vehicles which are designed to determine a route of the respective motor vehicles; and
a data processing device to determine a network data record quantifying the mobile communications network quality, the network data record being continually updated, taking into consideration the data transmitted to the database, the network data record being stored in the database, the network data record quantifying the mobile communications network quality along the travel routes traveled of the respective motor vehicles, wherein
a communication unit of a select motor vehicle retrieves an individual data record quantifying the mobile communications network quality along the route of the select motor vehicle, the individual data record being obtained from the network data record, the individual data record being acquired from the database after the select motor vehicle determines the route, and
the communication unit of the select motor vehicle downloads mobile communications data for operating respective different applications within the select motor vehicle, the mobile communications data being downloaded into a data memory of the select motor vehicle by the communication unit, the mobile communications data being downloaded taking into consideration for the different applications, the individual data record, the mobile communications data being downloaded according to specified respective data rates, the data rates being specified by allocating available mobile communications data to the different applications, wherein
a prediction is made regarding which of the different applications will be used along the route of the select motor vehicle,
based on the individual data record quantifying the mobile communications network quality along the route, and based on the prediction regarding which of the different applications will be used, data are downloaded into the data memory so that the data will be available locally within the select motor vehicle when needed by the applications predicted to be used,
the prediction is a prediction regarding a sequence with which the different applications will be used by a user, and
the individual data record is taken into consideration for the different applications of the select motor vehicle to specify a sequence according to which the mobile communications data is allocated to the different applications.

19. The system as claimed in claim 18, wherein the applications are network-quality-dependent applications.

20. A method for determining a mobile communications network quality and downloading of mobile communications data, comprising:
determining a network data record quantifying availability of wireless data for download into motor vehicles while the motor vehicles travel along different routes, the network data record being stored in a database remote from the motor vehicles;
retrieving an individual data record from the network data record stored in the database, the individual data record being obtained for a select motor vehicle, the individual data record relating to a planned route on which the select motor vehicle plans to travel, the individual data record being retrieved after the planned route is determined, the individual data record quantifying availability of wireless data for download into the select motor vehicle as the select motor vehicle travels along the planned route, the individual data record containing information relating to how the availability of wireless data for download changes along the planned route;
predicting in a prediction which of a plurality of different applications will be used as the select motor vehicle travels along the planned route; and
within the select motor vehicle, using the individual data record to allocate wireless data to the applications predicted to be used as the select motor vehicle travels along the planned route, the individual data record being used to help ensure that wireless data has been downloaded or is available for download when needed by the applications predicted to be used, wherein
the prediction is a prediction regarding a sequence with which the different applications will be used by a user, and
the individual data record is taken into consideration for the different applications of the select motor vehicle to specify a sequence according to which the mobile communications data is allocated to the different applications.

* * * * *